US008825346B2

(12) United States Patent
Roessle et al.

(10) Patent No.: US 8,825,346 B2
(45) Date of Patent: Sep. 2, 2014

(54) METHOD AND DEVICE FOR START/STOP CONTROL OF AN INTERNAL COMBUSTION ENGINE

(75) Inventors: Markus Roessle, Stuttgart (DE); Ewald Mauritz, Weissach (DE); Falco Sengebusch, Stuttgart-Feuerbach (DE)

(73) Assignee: Robert Bosch GmbH, Stuttgart (DE)

(*) Notice: Subject to any disclaimer, the term of this patent is extended or adjusted under 35 U.S.C. 154(b) by 730 days.

(21) Appl. No.: 12/998,359

(22) PCT Filed: Aug. 26, 2009

(86) PCT No.: PCT/EP2009/061013
§ 371 (c)(1), (2), (4) Date: Jun. 22, 2011

(87) PCT Pub. No.: WO2010/046164
PCT Pub. Date: Apr. 29, 2010

(65) Prior Publication Data

US 2011/0246050 A1 Oct. 6, 2011

(30) Foreign Application Priority Data

Oct. 20, 2008 (DE) ........................ 10 2008 042 946

(51) Int. Cl.
*B60T 7/12* (2006.01)
*F02N 11/08* (2006.01)
*F02N 15/06* (2006.01)

(52) U.S. Cl.
CPC ....... *F02N 11/0855* (2013.01); *F02N 2300/102* (2013.01); *F02N 2200/021* (2013.01); *F02N 15/067* (2013.01); *F02N 2200/022* (2013.01); *F02N 11/0814* (2013.01); *F02N 2200/041* (2013.01)
USPC ........................................ 701/112; 701/113

(58) Field of Classification Search
USPC ........................ 701/101, 112, 113, 114, 115
See application file for complete search history.

(56) References Cited

U.S. PATENT DOCUMENTS

| | | | | |
|---|---|---|---|---|
| 4,848,170 A * | 7/1989 | Inagaki et al. | ...................... | 74/6 |
| 6,675,758 B2 * | 1/2004 | Nagata et al. | ............. | 123/192.1 |
| 7,996,135 B2 * | 8/2011 | Ishii et al. | ....................... | 701/54 |
| 2008/0162007 A1 * | 7/2008 | Ishii et al. | ....................... | 701/54 |
| 2011/0184626 A1 * | 7/2011 | Mauritz et al. | ................ | 701/102 |
| 2011/0202264 A1 * | 8/2011 | Sengebusch | .................. | 701/113 |
| 2012/0191329 A1 * | 7/2012 | Roessle et al. | ................ | 701/113 |

FOREIGN PATENT DOCUMENTS

| | | |
|---|---|---|
| CN | 102112721 | 6/2011 |
| DE | 10 2005 016 053 | 12/2005 |
| DE | 10 2006 011 644 | 9/2007 |
| DE | 10 2006 039 112 | 2/2008 |

(Continued)

*Primary Examiner* — John Kwon
(74) *Attorney, Agent, or Firm* — Kenyon & Kenyon LLP

(57) ABSTRACT

In a method for controlling a start/stop operation of an internal combustion engine in a motor vehicle, the controller activates a starting device which has a starter motor and a meshing device for the purpose of starting the internal combustion engine and of executing a start/stop operation, the rotational speed and position of a crankshaft of the internal combustion engine being detected with the aid of a detector device. To provide vehicle comfort in start/stop mode and to implement meshing of a starter pinion with the ring gear at a coasting rotational speed at reduced noise and wear, a point in time is determined for meshing with the ring gear of a coasting internal combustion engine after the internal combustion engine has been shut down.

10 Claims, 3 Drawing Sheets

(56) References Cited

FOREIGN PATENT DOCUMENTS

| | | |
|---|---|---|
| EP | 1 041 275 | 10/2000 |
| EP | 1 457 652 | 9/2004 |
| JP | 2004-245106 | 9/2004 |
| JP | 2005-330813 | 12/2005 |
| JP | 2007-32388 | 2/2007 |
| JP | 2010-31851 | 2/2010 |
| WO | WO 2007/101770 | 9/2007 |

* cited by examiner

METHOD AND DEVICE FOR START/STOP CONTROL OF AN INTERNAL COMBUSTION ENGINE

BACKGROUND OF THE INVENTION

1. Field of the Invention

The present invention relates to a method for controlling a start/stop operation of an internal combustion engine in a motor vehicle, the controller activating a starting device which has a starter motor and a meshing device for the purpose of starting the internal combustion engine and of executing a start/stop operation, the rotational speed and position of a crankshaft of the internal combustion engine being detected with the aid of a detector device. The present invention furthermore relates to a computer program product and to a controller for a start/stop operation of the internal combustion engine in a motor vehicle, it being possible to start the internal combustion engine with the aid of an electric motor as the starter motor, and the controller having a microcomputer which includes a program memory for activating the starter motor which has a meshing device for meshing a starter pinion with the ring gear of an internal combustion engine.

2. Description of Related Art

To save fuel and lower emissions, methods are known for shutting down the internal combustion engine in a vehicle using an engine controller according to specified shutdown conditions, in particular after a specified timeout, for example at traffic lights or other traffic obstacles which force the vehicle to a temporary stop. An internal combustion engine is usually started with the aid of a starter pinion which may be activated by a starter motor which is meshed with a ring gear of an internal combustion engine. In such a design of the internal combustion engine, which is started with the aid of a starter pinion, minimum times which must pass before the internal combustion engine may be restarted exist for a restart.

A device and a method for operating a device having a starter pinion and a ring gear of an internal combustion engine are known from published German patent application document DE 10 2006 011 644 A1, the rotational speed of the ring gear and the starter pinion being ascertained for the purpose of meshing the starter pinion after shutting down the internal combustion engine at largely the same rotational speed as during coasting of the internal combustion engine. The starter pinion remains in a meshed state until the internal combustion engine starts to rotate.

Published German patent application document DE 10 2006 039 112 A1 describes a method for determining the rotational speed of the starter for an internal combustion engine of a motor vehicle. It further describes the fact that the starter motor includes a separate starter control unit for calculating the rotational speed of the starter and for first accelerating the starter pinion of the starter motor in a start/stop mode without meshing if self-starting of the internal combustion engine is no longer possible due to a lowered rotational speed. The starter pinion is introduced into the ring gear of the coasting internal combustion engine at a synchronous rotational speed.

Published European patent document EP 1 041 275 B1 describes a starting device for setting a ring gear of an internal combustion engine in motion with the aid of a starter pinion which may be activated with the aid of a starter motor. To avoid the danger of overloading the individual teeth of the starter pinion or the ring gear, which, act upon each other, the starter motor is first deactivated after meshing begins and is first driven under partial load and subsequently under full load after the starter motor has achieved a sufficient meshing depth.

An object of the present invention is to refine a method, a computer program product and a controller of the aforementioned type in such a way that vehicle comfort in start/stop mode is improved and the meshing of a starter pinion with a ring gear is achieved at a coasting rotational speed at reduced noise and wear.

BRIEF SUMMARY OF THE INVENTION

One idea of the present invention is to take into account a characteristic rotational speed variation during coasting of an internal combustion engine for meshing the starter pinion with the ring gear and thus produce less noise during meshing as well as reduced wear. In addition, the meshing operation is carried out safely and successfully.

The object is achieved by the fact that a point in time for meshing with a ring gear of a coasting internal combustion engine is determined after the internal combustion engine has been shut down. After the internal combustion engine has been shut down, a characteristic coasting behavior exists, according to which meshing times exist which are favorable because the rotational speed does not change quickly over time and, in turn, determined time intervals exist in which the rotational speed decreases very rapidly and a point in time for meshing is therefore less favorable.

According to the present invention, a point in time for meshing, in which the internal combustion engine has a constant, coasting rotational speed within a certain tolerance range, is determined after the internal combustion engine has been shut down. The noise development is thus reduced and wear during meshing is minimized.

According to a method which refines the present invention, the rotational speed for a predetermined meshing point in time is calculated from at least two preferred characteristic rotational speed values, in particular at ignitable top dead centers of cylinders of the internal combustion engine, in advance of the coasting internal combustion engine. Instantaneous influences which impact the coasting behavior of the internal combustion engine, for example temperature or changing coefficients of friction, are thus taken into account. By precalculating the rotational speed on the basis of characteristic rotational speed values, it is possible to determine a rotational speed for a predetermined meshing point in time of the internal combustion engine with the aid of a simple method and few data values and to activate the starter motor in such a way that the difference in rotational speed between the starter pinion and ring gear is minimized.

According to a further preferred method, a tolerance range is calculated shortly before and after an ignitable top dead center of the internal combustion engine as the point in time for meshing the starter pinion, the internal combustion engine having an essentially small variation in rotational speed over time in this top dead center. A so-called plateau phase of this type thus has small rotational speed variations of a coasting internal combustion engine within a determined tolerance range during a determined time window shortly before and after a top dead center. A meshing point in time within this time window of a plateau phase is therefore preferred. A piston in a cylinder of an internal combustion engine minimizes its velocity when it arrives at the ignition top dead centers (ITDC), since air in the cylinder is compressed. After passing the dead center, the piston is again accelerated by compressed air, so that the rotational speed increases slightly or decreases at a slower rate. This time period may be viewed as constant within a certain tolerance range and described as a plateau.

The starter motor is then supplied with current in such a way that it accelerates the starter pinion to a predetermined rotational speed at the point in time of a plateau of this type, and the starter pinion may thus be meshed at a predetermined point in time.

To mesh the starter pinion as reliably as possible, according to a method refining the present invention, one of the last ignitable top dead centers of the internal combustion engine, in particular the next-to-the-last ignitable top dead center and particularly preferably the last ignitable top dead center of the internal combustion engine, is precalculated as the point in time for meshing the starter pinion, and the starter pinion is simultaneously meshed at one of these points in time.

A method according to the present invention thus has the advantage that the last ignitable top dead centers have a largely constant rotational speed window for a particularly long period of time. The time continues to increase at the last ignitable top dead centers as the rotational speed decreases. Thus, the reliability of meshing at an essentially identical circumferential rotational speed of the starter pinion and ring gear continues to improve. The easiest approach is thus to carry out the meshing action at the point in time of the last ignitable top dead center of the internal combustion engine.

To save electrical power and avoid overloading the on-board electrical system, according to a further preferred method, the starter motor is supplied with current at a time after a point in time $t_1$, which corresponds to the shutdown of the internal combustion engine, for meshing at a point in time $t_2$ and is accelerated to a precalculated rotational speed.

According to a further preferred method, the starter pinion is meshed during a time-speed window of the internal combustion engine in that the rotational speed of the internal combustion engine forms a plateau in a time-speed characteristic map. As explained above, this has the advantage that the rotational speed of the starter pinion activated by the starter motor may be better adjusted, and the rotational speed of the internal combustion engine may simultaneously be accelerated to an accelerated rotational speed of the starter motor if the meshing operation is provided shortly after the ignitable top dead center.

The meshing device is also preferably supplied with current at a point in time $t_3$ to mesh the starter pinion with the ring gear at a point in time $t_4$ at an essentially identical rotational speed in a time-speed window with a rotational speed plateau of the internal combustion engine. Point in time $t_3$ is calculated in advance.

To ensure the broadest possible range of applications, according to an alternative method, a new point in time $t_{40}$, at which the starter pinion is meshed with the ring gear of the internal combustion engine at a defined rotational speed, is determined when the rotational speed of the internal combustion engine lies on a final plateau above the maximum rotational speed of the starter motor. The point in time is thus adjusted to the rotational speed of the starter motor to mesh the starter pinion with a rotating, coasting ring gear of an internal combustion engine. By meshing the starter pinion with the ring gear of a coasting internal combustion engine, the availability for starting the internal combustion engine is achieved faster in start/stop mode.

The object is also achieved by a computer program product which is loadable to a program memory of a controller by program commands for the purpose of executing all steps of the method described above when the computer program product is implemented in a controller.

The computer program product has the advantage that no additional components are needed in the vehicle, but rather an existing controller in the vehicle may be used as a module. The computer program product may be provided, for example, in the engine controller, a separate, independent controller, or a starter controller as a physical medium in the form of a semiconductor memory. The computer program product has the additional advantage that it is easily adaptable to individual, determined customer requirements, and it also enables the operating strategy to be improved using empirical values.

The object is also achieved by a controller in such a way that the microcomputer is designed to be an evaluation and control unit for activating the starting device in a defined manner according to a characteristic coasting behavior of the rotational speed of the internal combustion engine, it being possible, in particular, to load a computer program product described above to the program memory for the purpose of carrying out the above-described method in a particularly preferred manner. The controller may be provided either in an engine controller or in a separate controller, for example as a starter controller. The controller is in information contact with the engine controller via a bus system or another suitable connection to obtain up-to-date rotational speed values. The controller has the further advantage that it is already provided largely for executing a start/stop operation in a vehicle and may thus be used to implement the present invention with only slight modifications.

It is understood that the aforementioned features and the features still to be explained below may be used not only in the particular combination specified but also in other combinations.

DETAILED DESCRIPTION OF THE INVENTION

Figure 1:
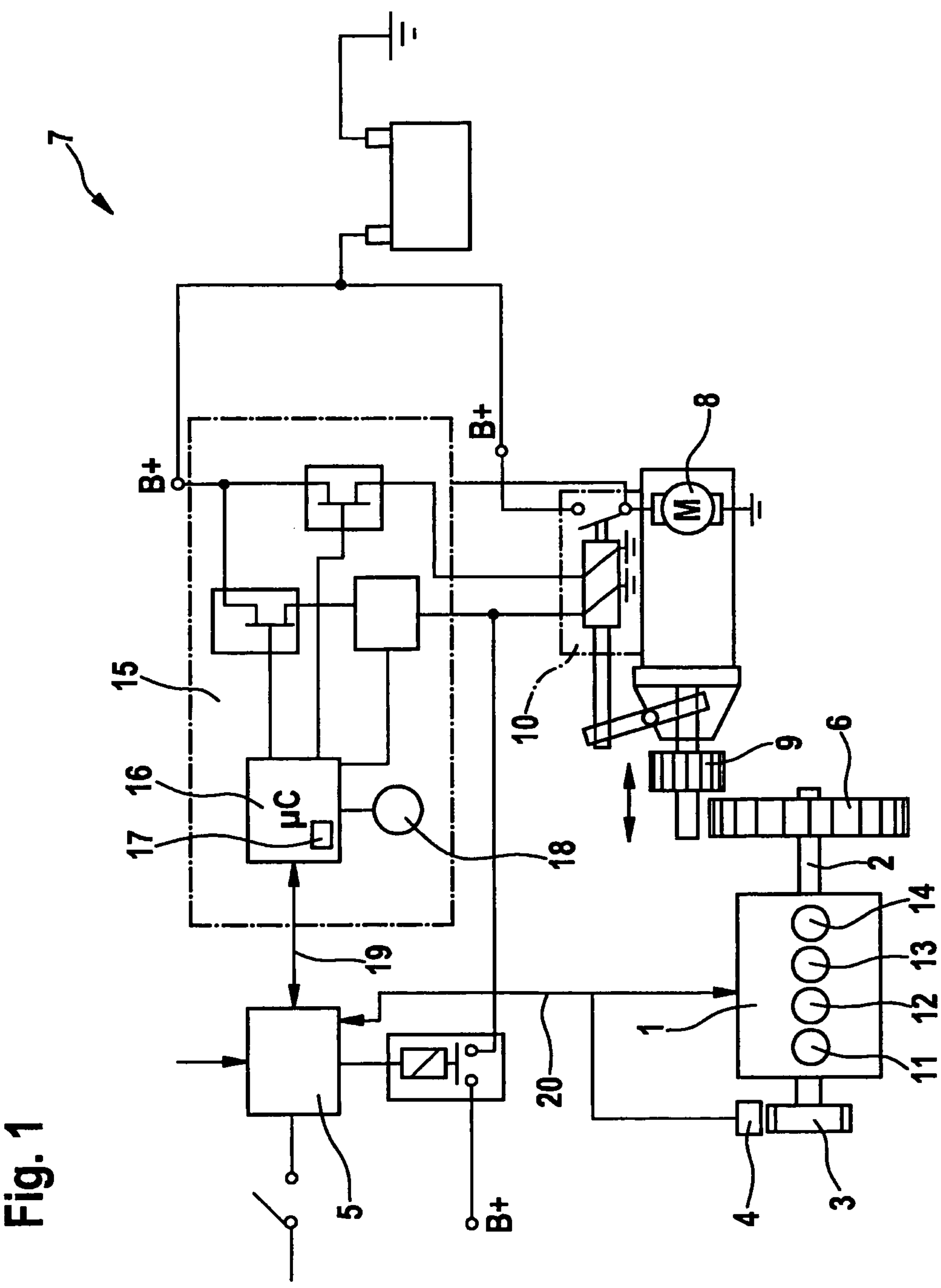
FIG. 1 shows a schematic circuit diagram of drive components for carrying out the method according to the present invention.

FIG. 1 shows a schematic circuit diagram of all important drive components for carrying out the method according to the present invention. An internal combustion engine 1 including cylinders 11, 12, 13, 14 has a crankshaft 2 with the aid of which internal combustion engine 1 is started. To determine the rotational speed and position of crankshaft 2, a toothed wheel 3 having teeth and at least one gap as a synchronous mark is located asymmetrically at one end of crankshaft 2 to be able to detect the crankshaft position and rotational speed with the aid of a detector device 4, which is mounted in a stationary manner. Detector device 4 is connected to an engine controller 5. Engine controller 5 has additional actuators and sensors on internal combustion engine 1 to activate internal combustion engine 1 in a defined manner.

Internal combustion engine 1 is started by a starting device 7 with the aid of a ring gear 6 which is attached to crankshaft 2. Starting device 7 includes a starter motor 8 having a starter pinion 9, which may be moved thereon in the axial direction, for meshing with ring gear 6. Starter motor 8 moves starter pinion 9 in the axial direction on a starter axis in a meshing device 10 designed to be a meshing relay. Meshing device 10 and starter motor 8 are activated in a defined manner by a starter controller 15. Starter controller 15 may activate meshing device 10 in a defined manner via electronic power switches and at least one switching relay, independently of the current supply to starter motor 8.

Controller 15 includes a microcomputer 16 having a program memory 17, in which a computer program product according to the present invention is stored, for example in the form of a semiconductor memory. Starter controller 15 is in information contact with microcomputer 16 via a conventional bus system 19, for example to obtain information for executing a start/stop operation.

Figure 2:
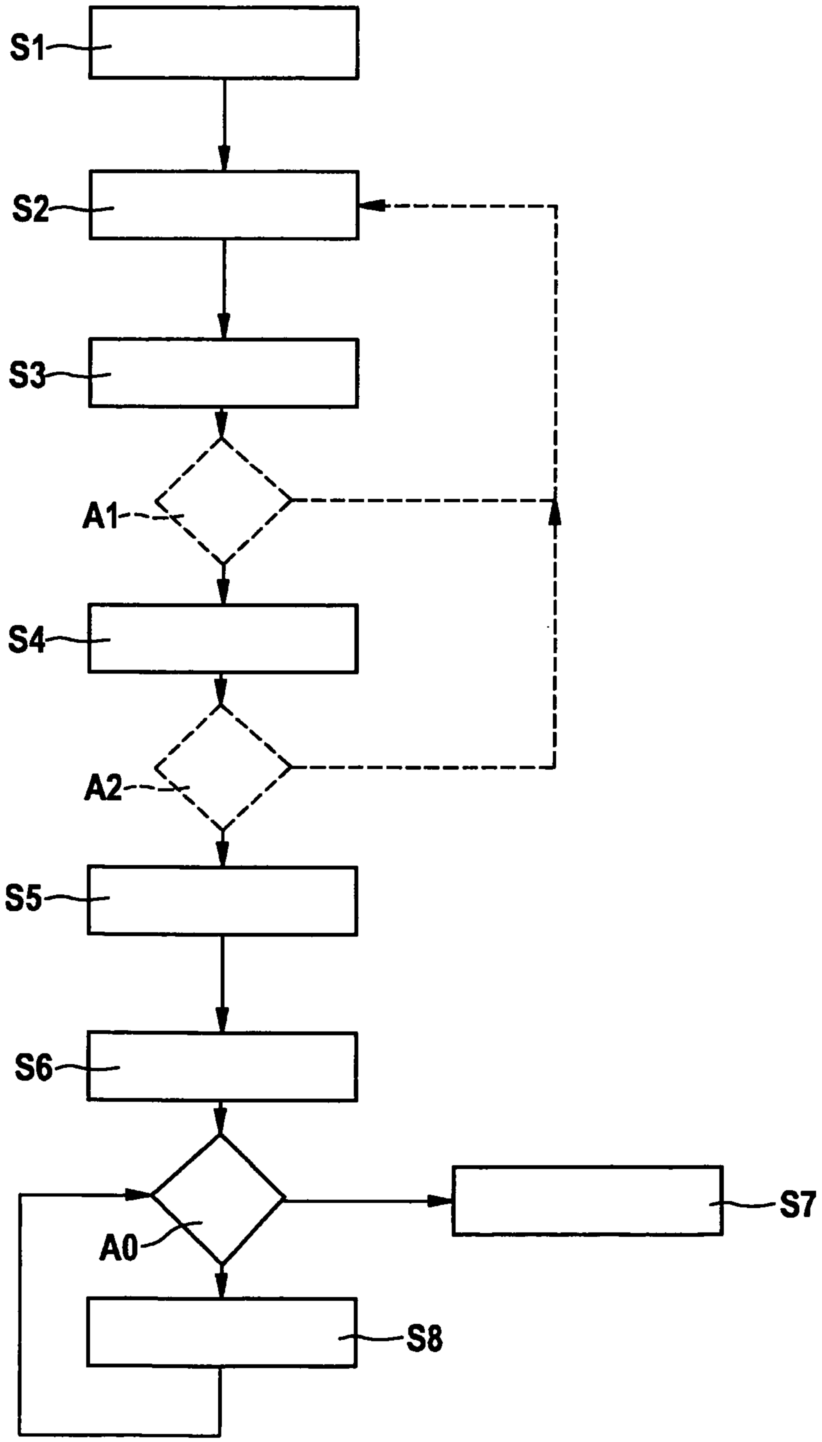
FIG. 2 shows a flow chart of the method according to the present invention.

FIG. 2 shows a flow chart having a sequence according to a method according to the present invention. In a step S1, internal combustion engine 1 is shut down on the basis of shutdown conditions detected by engine controller 5. The shutdown conditions are communicated to starter controller 15 having microcomputer 16 via a conventional bus system 19.

In a step S2, the starter controller receives the rotational speed and crankshaft position of the internal combustion engine in such a way that, in a step S3, the starter controller calculates and defines a suitable point in time for meshing starter pinion 9 with ring gear 6 of internal combustion engine 1 according to a calculation algorithm. The rotational speed is preferably measured from just a few items of data, in particular characteristic data, for example the ignitable top dead center (ITDC) of internal combustion engine 1 in the coasting state. According to the present invention, an ignitable top dead center ITDC is selected from at least two of these values for the purpose of meshing starter pinion 9 with ring gear 6. The point in time is preferably selected slightly after ignitable top dead center ITDC, approximately in the middle of a time window in a tolerance range in which the variation in the rotational speed of internal combustion engine 1 is very small over a time period of, for example, 5 milliseconds, and the rotational speed even increases slightly in the range of approximately 5 milliseconds. This range is also referred to as the plateau of the rotational speed.

In a query step A1, the crankshaft position and the rotational speed are optionally further measured and checked, and the meshing point in time is corrected, if necessary.

In a step S4, starter motor 8 is supplied with current at a point in time $t_2$ to enable starter pinion 9 to be meshed with the ring gear of internal combustion engine 1 at defined point in time $t_4$ at an essentially identical rotational speed W.

In a query step A2, the rotational speed and crankshaft position are optionally further checked to determine whether the precalculated point in time is still correct, and this point in time is adjusted to the newly measured values, if necessary.

In step S5, the rotational speed of starter motor 8 is checked and adjusted, if necessary.

In step S6, meshing device 10 is supplied with current at a point in time $t_3$ to mesh starter pinion 9 with ring gear 6 within a predetermined meshing time or response time of the meshing device at precalculated meshing point in time $t_4$ within the desired tolerance range having a minor variation in the decreasing, coasting rotational speed of crankshaft 2.

In a query A0, a check is carried out to determine whether a start request is detected by engine controller 5. If this request is detected, internal combustion engine 1 is started in a step S7 in which more current is supplied to starter motor 8, if necessary a maximum cranking current.

If a start request is not yet detected, starter motor 8 continues to coast in the meshed state with internal combustion engine 1, if necessary, until a standstill is achieved. The method returns to query step A0 and is repeated in the loop until a start request is detected, so that the internal combustion engine is restarted on the basis of a brief stop.

Figure 3:
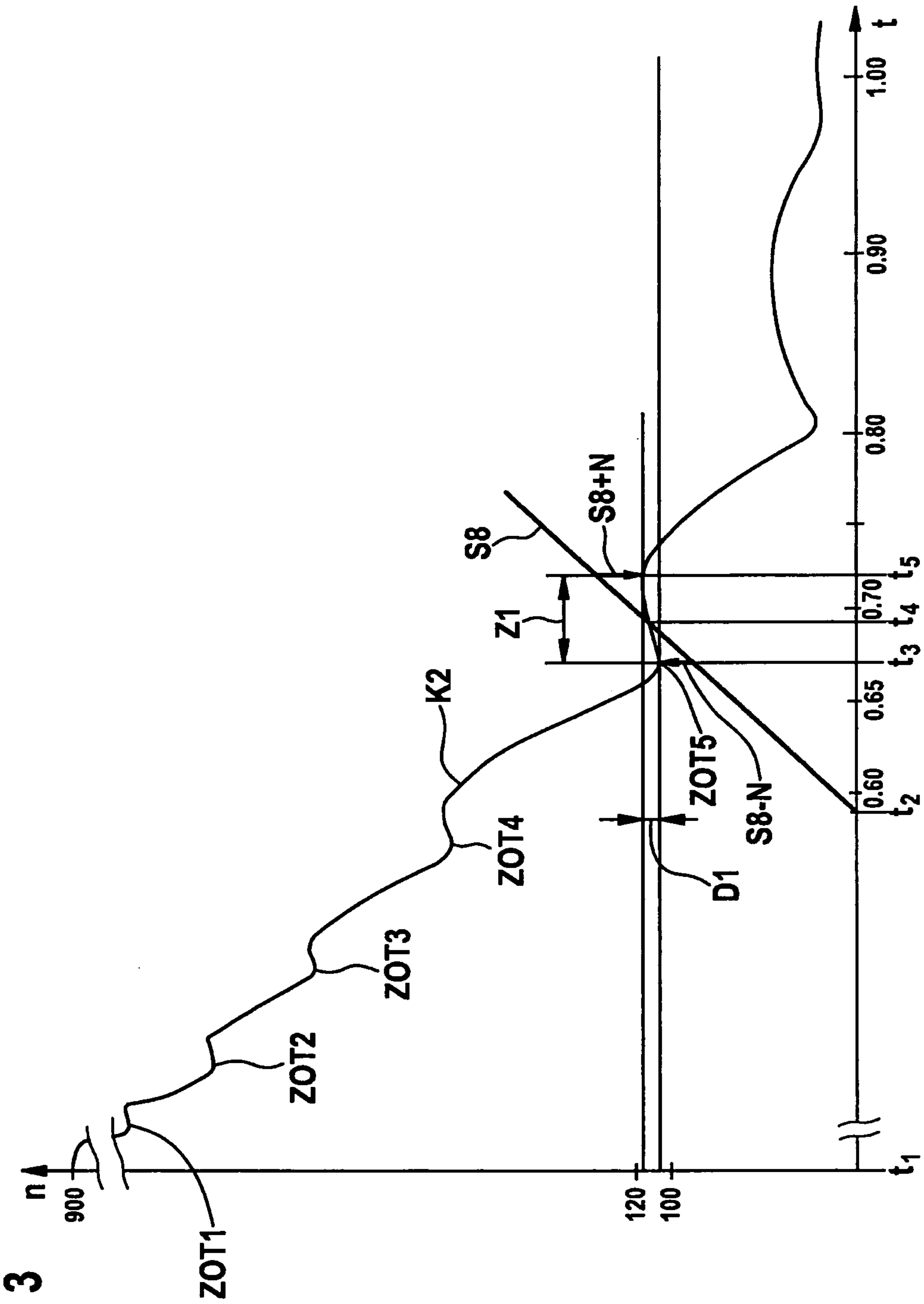
FIG. 3 shows a time-speed diagram according to the method of the present invention.

FIG. 3 shows a time-speed characteristic K2 of a crankshaft 2 of an internal combustion engine 1 and the rotational speed of starter motor 8. The internal combustion engine is shut down at a point in time $t_1$. According to FIG. 3, the rotational speed of the crankshaft varies according to a very typical characteristic and at a great time resolution. At ever greater time intervals, longer phases result in which the rotational speed is first braked due to a piston in the individual cylinders passing ignitable top dead centers ITDC and then accelerated again following air compression in the cylinder. Precalculated meshing point in time $t_4$ is placed in one of the last plateaus, as shown in FIG. 3, preferably in last plateau P1 of a time window Z1 lasting approximately 5 milliseconds, and within a rotational speed tolerance range D1 lasting approximately 10 revolutions per minute. At point in time $t_2$, starter motor 8 is supplied with current and accelerated at a rotational speed according to characteristic S8, which is proportionate to the time. Shortly before meshing at point in time $t_3$, meshing device 10 is supplied with current to mesh starter pinion 9 in good time within time and speed windows Z1, D1 within so-called speed plateau P1. The meshing noise and wear are thus extremely low. Upon restarting the internal combustion engine, availability is provided at a time which occurs long before crankshaft 2 comes to a standstill. In addition, starter pinion 9 is meshed with a greater degree of reliability and is not pushed back, for example due to an excessively great difference in rotational speeds resulting from a tooth-on-tooth position in the opposite direction from the direction in which meshing device 10 is being driven. FIG. 3 furthermore shows the possible rotational speed difference between rotational speed S8 from starter motor 8 at the beginning of rotational speed plateau P1 of internal combustion engine 1, using an arrow S8–N, and at the end of the rotational speed plateau at time $t_5$, when the rotational speed of the internal combustion engine is again substantially braked. The difference in rotational speed between starter motor 8 and internal combustion engine 1 is illustrated by an arrow S8+N. Point in time $t_2$ and point in time $t_3$ coincide with the beginning of rotational speed plateau P1 in this specific embodiment. All figures show only schematic and not true-to-scale representations. In addition, reference is made, in particular, to the drawings as essential to the present invention.

What is claimed is:

1. A method for controlling a start/stop operation of an internal combustion engine in a motor vehicle, comprising:

detecting, using a detector device, a rotational speed and position of a crankshaft of the internal combustion engine after the internal combustion engine has been shut down;

determining, after the internal combustion engine has been shut down, a point in time for meshing with a ring gear of a coasting internal combustion engine; and selectively activating, using a controller, a starting device which has a starter motor and a meshing device for the purpose of starting the internal combustion engine as part of the start/stop operation.

2. The method as recited in claim 1, wherein a rotational speed for a predetermined meshing point in time is calculated in advance of the coasting internal combustion engine from at least two characteristic rotational speed values at ignitable top dead centers of cylinders.

3. The method as recited in claim 1, wherein a tolerance range shortly before and after an ignitable top dead center of the internal combustion engine is calculated as the point in time for meshing a starter pinion of the starter motor, the internal combustion engine having a predetermined variation in rotational speed over time in the ignitable top dead center.

4. The method as recited in claim 2, wherein the last ignitable top dead center of the internal combustion engine is calculated as the point in time for meshing a starter pinion of the starter motor, and the starter pinion is meshed at the point in time corresponding to the last ignitable top dead center.

5. The method as recited in claim 2, wherein the starter motor is supplied with current after a predetermined time period following a point in time corresponding to the shutdown of the internal combustion engine, and the starter motor is accelerated to a precalculated rotational speed for meshing.

6. The method as recited in claim 1, wherein a starter pinion of the starter motor is meshed in a time-speed characteristic map of the internal combustion engine in that the rotational speed of the internal combustion engine forms a plateau in the time-speed characteristic map.

7. The method as recited in claim 2, wherein the meshing device is supplied with current at a first selected point in time to mesh a starter pinion of the starter motor with the ring gear at a second point in time at essentially identical rotational speeds in a time-speed window with a rotational speed plateau of the internal combustion engine.

8. The method as recited in claim 7, wherein a new point in time, at which the starter pinion is meshed with the ring gear of the internal combustion engine at a defined rotational speed, is determined when the rotational speed of the internal combustion engine lies within a final plateau above the maximum rotational speed of the starter motor.

9. A non-transitory computer-readable data-storage medium storing a computer program having program codes which, when executed on a computer, perform a method for controlling a start/stop operation of an internal combustion engine in a motor vehicle, the method comprising:

detecting, using a detector device, a rotational speed and position of a crankshaft of the internal combustion engine after the internal combustion engine has been shut down;

determining, after the internal combustion engine has been shut down, a point in time for meshing with a ring gear of a coasting internal combustion engine; and selectively activating a starting device which has a starter motor and a meshing device for the purpose of starting the internal combustion engine as part of the start/stop operation.

10. A control system for a start/stop operation of an internal combustion engine in a motor vehicle, comprising:

a detector device configured to detect a rotational speed and position of a crankshaft of the internal combustion engine after the internal combustion engine has been shut down;

a controller configured to: (i) determine, after the internal combustion engine has been shut down, a point in time for meshing with a ring gear of a coasting internal combustion engine; and (ii) selectively activate a starting device which has a starter motor and a meshing device for the purpose of starting the internal combustion engine as part of the start/stop operation.

* * * * *